United States Patent
Olah et al.

(10) Patent No.: US 12,472,456 B2
(45) Date of Patent: Nov. 18, 2025

(54) FIXING INTERFACE, AIR DRYER CARTRIDGE AND AIR TREATMENT DEVICE

(71) Applicant: KNORR-BREMSE Systeme fuer Nutzfahrzeuge GmbH, Munich (DE)

(72) Inventors: Tibor Olah, Kecskemet (HU); Tibor Polyak, Hetenyegyhaza (HU); Laszlo Toth Zoltan, Kiskunfelegyhaza (HU); Gabor Ratatics, Helvecia (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 322 days.

(21) Appl. No.: 18/267,851

(22) PCT Filed: Dec. 22, 2021

(86) PCT No.: PCT/EP2021/087230
§ 371 (c)(1),
(2) Date: Jun. 16, 2023

(87) PCT Pub. No.: WO2022/152531
PCT Pub. Date: Jul. 21, 2022

(65) Prior Publication Data
US 2024/0033678 A1    Feb. 1, 2024

(30) Foreign Application Priority Data

Jan. 12, 2021 (EP) .................................. 21151239
Mar. 9, 2021 (EP) .................................. 21161638

(51) Int. Cl.
*B01D 53/04* (2006.01)
*B01D 53/26* (2006.01)

(52) U.S. Cl.
CPC ....... *B01D 53/0415* (2013.01); *B01D 53/261* (2013.01); *B01D 2259/4566* (2013.01)

(58) Field of Classification Search
CPC .. B01D 53/04; B01D 53/0415; B01D 53/261; B01D 27/08; B01D 2259/4566; B01D 46/0004; B01D 46/001
(Continued)

(56) References Cited

U.S. PATENT DOCUMENTS 3,380,593 A * 4/1968 Uhen .................... B01D 27/02
                                                        210/444
4,956,086 A * 9/1990 Thomsen ............... B01D 35/30
                                                        55/504
(Continued)

FOREIGN PATENT DOCUMENTS

CN    102666231 A    9/2012
CN    108778445 A    11/2018
(Continued)

OTHER PUBLICATIONS

International Search Report (PCT/ISA/210) issued in PCT Application No. PCT/EP2021/087230 dated Apr. 14, 2022 (2 pages).
(Continued)

Primary Examiner — Frank M Lawrence, Jr.
(74) Attorney, Agent, or Firm — Crowell & Moring LLP

(57) ABSTRACT

A fixing interface for fixing an air dryer cartridge and an air treatment device for a vehicle, especially a utility vehicle, includes a cartridge base assignable to the air dryer cartridge. The cartridge base has a fixing flange and a circular ring-shaped metal sheet in contact with the fixing flange in the mounted state. A housing portion assignable to a housing of the air treatment device fixes, in a mounted state, the fixing flange to the housing portion. The fixing flange has a first flange fixing element and the housing portion has a first housing fixing element. The first flange fixing element and the first housing fixing element, in the mounted state, are engaged with one another. The fixing interface further has a locking element, wherein the locking element, in the
(Continued)

mounted state, is engaged either directly and/or indirectly with the first flange fixing element and/or the first housing fixing element such that a degree of freedom of the fixing flange with regard to the housing portion or vice versa is locked.

20 Claims, 8 Drawing Sheets

(58) Field of Classification Search
USPC ....... 96/147, 151; 55/DIG. 17, 385.3; 34/80, 34/472, 473; 210/282
See application file for complete search history.

(56) References Cited

U.S. PATENT DOCUMENTS

| | | | |
|---|---|---|---|
| 5,209,764 A | 5/1993 | Eberling | |
| 5,901,464 A | 5/1999 | Kazakis et al. | |
| 5,961,698 A | 10/1999 | Dossaji et al. | |
| 6,023,834 A * | 2/2000 | Brown | B01D 27/08 29/451 |
| 6,676,722 B1 * | 1/2004 | Clements | B01D 46/2407 55/378 |
| 2010/0236653 A1 | 9/2010 | Hilberer | |
| 2012/0118157 A1 | 5/2012 | Eidenschink et al. | |
| 2012/0304608 A1 | 12/2012 | Eidenschink et al. | |
| 2018/0236398 A1 * | 8/2018 | Heer | B01D 53/0415 |
| 2019/0105586 A1 | 4/2019 | Schumacher | |
| 2021/0270371 A1 * | 9/2021 | Leinung | F16J 15/061 |
| 2022/0266172 A1 * | 8/2022 | Schumacher | B01D 27/08 |
| 2024/0226777 A1 * | 7/2024 | Vercammen | B01D 27/08 |

FOREIGN PATENT DOCUMENTS

| | | |
|---|---|---|
| DE | 32 08 561 A1 | 9/1983 |
| DE | 82 28 745 U1 | 3/1984 |
| DE | 692 10 614 T2 | 10/1996 |
| DE | 10 2007 011 256 A1 | 9/2008 |
| DE | 10 2016 208 355 A1 | 11/2017 |
| DE | 10 2018 113 965 A1 | 12/2019 |
| DE | 10 2018 113 967 A1 | 12/2019 |
| EP | 0 933 117 A1 | 8/1999 |
| EP | 3 433 001 B1 | 7/2020 |
| WO | WO 2011/000766 A1 | 1/2011 |

OTHER PUBLICATIONS

Written Opinion (PCT/ISA/237) issued in PCT Application No. PCT/EP2021/087230 dated Apr. 14, 2022 (9 pages).
Extended European Search Report issued in European Application No. 21161638.8 dated Aug. 31, 2021 (10 pages).
Cover page of EP 2 448 801 A1 published May 9, 2012 (1 page).
Chinese-language Office Action issued in Chinese Application No. 202180090354.8 dated Jul. 29, 2025, with partial English translation (18 pages).

* cited by examiner

FIXING INTERFACE, AIR DRYER CARTRIDGE AND AIR TREATMENT DEVICE

BACKGROUND AND SUMMARY

The present invention relates to a fixing interface for fixing of at least one air dryer cartridge and at least one air treatment device for a vehicle, especially a utility vehicle. The firing interface has at least one cartridge base assignable to the air dryer cartridge, wherein the cartridge base comprises at least one fixing flange, and has at least one housing portion assignable to at least one housing of the air treatment device.

Further, the present invention relates to an air dryer cartridge for an air treatment device for a vehicle, especially a utility vehicle, with at least one cartridge base and with at least one fixing interface as mentioned above. Additionally, the present intention relates to an air treatment device for a vehicle, especially utility vehicle, with at least one housing comprising at least one housing portion, with at least one air dryer cartridge as mentioned above, and with at least one fixing interface as mentioned above.

In the field of vehicles and especially utility or commercial vehicles, usually pneumatic systems are used for brakes, suspension and other auxiliary systems, wherein the distribution of the air is handled by a multi-circuit protection valve that can divide the air provided by a compressor or the like, and handles the different opening and closing pressures, the pressure limitation of each circuits, and the circuit protection.

Before the pressurized air may be controlled this way, an important measure is to dry this air (as it still contains humidity of the atmosphere) provided by the compressor. This drying procedure is established by an air dryer cartridge being arranged between the compressor and the multi-circuit protection valve such that dried and de-oiled air is provided to the multi-circuit protection valve.

Such conventional air dryer cartridges are already known in the prior art.

DE 32 08 561 A1 shows an air-drying device having a connection housing on which a cap-shaped container is mounted, which accommodates a drying agent cartridge. For ease of changing the drying agent cartridge, a clamping bracket is used, which is swivellably mounted on the housing and can be swivelled over the container and fixed there.

DE 692 10 614 T2 discloses an air dryer control system in which the compressed air output of a compressor is dried by one of two air dryers connected in parallel. The purging and drying cycles of the air dryers are alternated by a timing and relay device.

EP 0 933 117 A1 discloses a shuttle valve for a gas drying system that cleans and dries a stream of unpurified pressurized gas received from a source thereof and supplied to a pneumatic system that uses such a purified pressurized air. The valve includes a housing that connects a drying assembly to a structure that conveys the unpurified pressurized air to the drying assembly.

EP 2 448 801 A1 shows an air dryer cartridge for a compressed air treatment system of a vehicle, in particular of a commercial vehicle, comprising a spring cover and a carrier element, which together define a volume of the air dryer cartridge in the assembled state of the air dryer cartridge, wherein a desiccant box arranged inside the volume and filled with a desiccant is provided.

U.S. Pat. No. 5,901,464 A relates to a twin tower air drying system for cleaning and drying a stream of unpurified pressurized air including a centrifugal separator having a baffle horizontally disposed therein to generally separate the centrifugal chamber into an upper sub-chamber and a lower sub-chamber; a pair of cavities each containing desiccant media and a purge tube with a flapper valve thereover to close and restrict flow of air through the purge tube when air is flowing upwardly through the cavity, and to open and promote air flow through the purge tube when air is flowing downwardly through the cavity.

U.S. Pat. No. 5,961,698 A discloses a twin tower gas drying system for cleaning and drying a stream of unpurified pressurized gas received from a source thereof for use of a pneumatic system. The drying system includes a manifold block provided with the plurality of ports. A separator and sump are connected to such a block and to one of the ports for initially separating moisture and particulates from such stream of unpurified gas, and for directing the remainder of the stream to the one port in the block.

EP 3 433 001 B1 discloses a bajonet fixation mechanism for an air dryer cartridge.

DE 82 28 745 discloses a depressurization screw with an axial bore hole and a radial bore hole, which a connected to each other a where the bore holes as depressurization channel.

DE 10 2007 011 256 A1 discloses a fixation and securing element for a pressurized air system.

DE 10 2016 208 355 A1 and DE 10 2018 113 967 A1 describe a radial sealing element for an air dryer cartridge of a depressurization system.

Basically, the fixing between the air dryer cartridge and the air dryer cartridge accommodating the desiccant container, according to the prior art, often is solved by one central threaded portion together with a bayonet locking. Thus, a large number of components and construction space together with a high assembling effort occurs.

It is therefore an object of the present invention to improve a fixing interface between an air dryer cartridge and an air treatment device as mentioned above, in particular in that this interface is simplified in structural and functional terms, and that the air dryer cartridge is easier to mount to the air treatment device.

Accordingly, a fixing interface for fixing of at least one air dryer cartridge and at least one air treatment device for a vehicle, especially utility vehicle, is provided with at least one cartridge base assignable to the air dryer cartridge, wherein the cartridge base comprises at least one fixing flange and a circular ring-shaped metal sheet in contact with the fixing flange in the mounted state; and with at least one housing portion assignable to at least one housing of the air treatment device for fixing, in a mounted state, the fixing flange to the housing portion, wherein the fixing flange comprises at least one first flange fixing element and wherein the housing portion comprises at least one first housing fixing element, wherein the at least one first flange fixing element and the at least one first housing fixing element, in the mounted state, are engaged with one another, wherein the fixing interface further comprises at least one locking element, wherein the at least one locking element, in the mounted state, is engaged either directly and/or indirectly with the at least one first flange fixing element and/or the at least one first housing fixing element such that at least one degree of freedom of the fixing flange with regard to the housing portion or vice versa is locked.

The invention is based on the basic idea that a fixing interface for fixing the air dryer cartridge and the air treatment device is provided, at which the at least one locking element is engaged either directly and/or indirectly with the at least one first flange fixing element and/or the at least one first housing fixing element in order to lock at least one degree of freedom. Especially, the locking element is formed separately from the at least one first flange fixing element and/or from the at least one first housing fixing element. Thus, the at least one locking element is formed as a separate element that is not formed integrally with the at least one first flange fixing element and/or with the at least one first housing fixing element. Additionally, it is contemplated that the at least one locking element is fixed to the fixing flange and/or the housing portion. This configuration enables a more flexible design of the locking element. The locking element or member may be formed by a locking pin, locking tab, locking screw, locking detent element or a locking clamp element. The overall design of the fixing interface further enables a very simple and reliable mechanical construction of the air dryer cartridge as well as the corresponding housing portion of the air treatment device for fixation and for locking the at least one degree of freedom. That is, a central threaded portion of the air dryer cartridge together with an expensive and complex bayonet locking may be unnecessary in regard to the design of the present invention. Further, the central threaded portion together with the bayonet locking often need special mounting tools and specifically trained employees that, all in all, complicate the mounting and assembling procedure of the air treatment device together with the dryer cartridge. Consequently, the sources of potential unintended mounting procedures or mistakes are also increased due to the complex conventional design of the mounting portion or mounting interface between the air dryer cartridge and the air treatment device.

In particular, the locking element can be formed separately from the at least one first flange fixing element and/or from the at least one first housing fixing element.

It is possible that the locking element is a safety screw. With a safety screw a simple, but reliable element can be used to lock the fixing interface. Manufacturing of the locking element, but also the mounting is easy and does not require the use of advanced tools or the like, rather normal and available tools can be used for locking and unlocking.

Additionally, the locking element can comprise at least one depressurization and/or deaeration channel. This way, an integration of two functions can be done, i.e. the integration of the fixation function (locking and unlocking) and also the function of depressurization and/or deaeration.

Also, it is possible that the at least one locking element is fixed to the circular ring-shaped metal sheet and/or the housing portion. As mentioned above, the at least one locking element is construed as a part or member that is separately formed from the at least one first flange fixing element and from the at least one first housing fixing element. That is, the way the at least one locking element is fixed at the fixing interface is quite unrestricted such that many fixing options may be realised. It is possible that the locking element in form of a screw is fixed to the circular ring-shaped metal sheet and the housing portion by screwing the fixation screw into the housing portion against the circular ring-shaped metal sheet.

Furthermore, the circular ring-shaped metal sheet can be in contact against a radial sealing element. By this type of sealing, less force is needed to create the needed sealing effect, which seals at the fixing interface the pressurized inside of the cartridge against the atmosphere.

Accordingly, it may be provided that the at least one degree of freedom is at least one rotational degree of freedom. In comparison to the prior art where the fixation of the air dryer cartridge at the air treatment device is solved by a central threaded portion that often needs to be mounted very precisely and with special tools (such as a torque wrench), the present solution according to the invention provides a very simple and reliable design by prohibiting the rotational degree of freedom. In this way, a rotational stop is provided by the at least one first flange fixing element and the at least one first housing fixing element such that a defined and very precise rotational movement from the pre-mounted state or non-mounted state to finally mounted state may be provided resulting in a better fixation performance.

Also, it is contemplated that the at least one first flange fixing element is formed by at least one flange fixing recess. Due to the basic design of the air dryer cartridge having a fixing flange at its bottom or base, with regard to the mounted state, the provision of a fixing recess is advantageous in structural and production aspects since the flange normally consists of metal sheet having a simple mechanic workability. Additionally, a flange fixing recess enables an easy implementation of a defined receiving geometry of the housing fixing element. Thus, a precise and defined flange fixing recess may be established with less effort in terms of manufacturing, costs and construction space. In this regard, the flange fixing recess may be formed by a flange fixing groove that is formed by a circular arc section.

Moreover, it is possible that the at least one first housing fixing element is formed by at least one housing fixing protrusion, especially housing fixing pin. As the housing portion of the air treatment housing substantially consists of many solid areas, the provision of such a housing fixing element is established quite easily. According to a first option, the first housing fixing element may be threaded into a corresponding housing thread of the housing portion. According to a second option, the first housing fixing element may be formed integrally with the housing portion of the air treatment device, for example by a milling operation. Both options provide a very simple design of the at least one first housing fixing element on the basis of technically matured processes. The provision of a fixing recess is therefore more affordable compared to its provision in the fixing flange as mentioned above.

In addition, it is contemplated that the fixing flange comprises at least one second flange fixing element being formed in a same manner as the at least one first flange fixing element and wherein the housing portion comprises at least one second housing fixing element being formed in a same manner as the at least one first housing fixing element. The advantages and technical teachings as mentioned above with regard to the at least one first flange fixing element and to the at least one first housing fixing element are also transferable in the same manner to the at least one second flange fixing element and to the at least one second housing fixing element accordingly.

Especially, it is possible that the fixing flange comprises at least one third flange fixing element being formed in a same manner as the at least one first flange fixing element and wherein the housing portion comprises at least one third housing fixing element being formed in a same manner as the at least one first housing fixing element. The advantages and technical teachings as mentioned with regard to the at least one first flange fixing element and to the at least one first housing fixing element are also transferable in the same manner to the at least one third flange fixing element and to the at least one third housing fixing element accordingly. The same appears with regard to the first, second, and third locking element.

Moreover, it is possible that the fixing interface, in the mounted state, comprises at least one pretension element. Especially, this pretension element can be axially arranged between the fixing flange and the housing portion for axial pretension, with regard to a longitudinal axis of the fixing interface, of the fixing flange against the housing portion or vice versa. In order to provide a sufficient sealing performance, especially in axial direction, an elastic pretension of the air dryer cartridge with regard to the air treatment device in axial direction is very important. Consequently, such a pretension element is very advantageous in terms of enhancing the sealing performance, especially in the axial direction. Further, as the air dryer cartridge with regard to the air treatment device moves during operation in axial direction in certain defined limits, this movement has to be compensated, which, preferably may be established by the pretension element such that the pretension is always maintained sufficiently resulting a better operation performance.

Furthermore, it is possible that the circular ring-shaped metal sheet forms a groove, in which the pretension element is received.

Further, it is contemplated that the pretension element is formed by at least one ring-shaped pretension spring element. As the air dryer cartridge normally is formed by a housing and a base structure each having a circular cross-section, a ring-shaped pretension spring element thus is also advantageous in order to adapt to these basic geometrical boundary conditions very easily. Further, ring-shaped geometries are very easy to manufacture, wherein the same appears with regard to the corresponding ring-shaped grooves in which the ring-shaped pretension spring element is supported or guided. Especially, the pretension element is formed by at least one ring-shaped axial pretension spring element having an axial compression spring. Additionally or alternatively, the pretension element may be formed by at least one ring-shaped wave spring element or wave spring element package. Additionally or alternatively, the pretension element may be formed by at least one ring-shaped disc spring element or disc spring element package.

The pretension element can be made (or at least partially be made) of spring steel.

Also, it is possible that the pretension element is made of an elastomer or rubber. In particular, it can be a rubber spring.

Additionally, it is contemplated that the axial pretension, in the mounted state, is locked and/or limited by the first and/or second and/or third housing fixing element together with the first and/or second and/or third flange fixing element, respectively. This arrangement enables an advantageous design in terms of a little construction space since the first and/or second and/or third housing fixing element is or are assigned with two functions as it or they form(s) an axial stop together with a rotational stop in just one construction element resulting in an increased functional density. In addition, the limitation or locking of the axial pretension may be adjusted precisely due to a corresponding adaption of the axial geometry of the first and/or second and/or third housing fixing element together with the first and/or second and/or third flange fixing element, respectively.

Further, it is possible that the at least one locking element and/or the at least one second locking element and/or the at least one third locking element comprises or comprise at least one depressurization and/or deaeration channel. The depressurization and/or deaeration channel represents a very important safety measure as, during the initial de-mounting step of the first of the three locking elements, the interior of the air dryer cartridge still is under operation pressure resulting in a potential safety issue. Therefore, such a channel is a very important safety measure in order to guarantee a safe air dryer cartridge de-mounting and exchanging procedure without an overpressure situation.

In addition, it is also contemplated that the housing portion comprises at least one collar, especially radial outer circular-shaped collar, accommodating the pretension element, wherein the collar further comprises at least one radial inner collar sealing surface accommodating at least one radial sealing element therein. The collar enables a reliable and defined axial pretension of the air dryer cartridge against the housing portion in order to avoid a leakage at the radial or axial sealing element. The leakage especially is coming from the pulsating movement of the air dryer cartridge during the load and regeneration phases. So, this design of the collar enables a functionally highly integrated solution for optimizing the axial and radial sealing performance together with the pretension performance.

Also, it is contemplated that the at least one first and/or second and/or third flange fixing element, additionally or alternatively, is or are formed by at least one first and/or second and/or third locking hole of at least one metal sheet that, in the mounted state, is fixed to the air dryer cartridge and is arranged between the fixing flange and the housing portion. This arrangement simplifies the mounting and de-mounting of the air dryer cartridge together with the general structural design of the fixing interface.

Furthermore, it may be provided that the at least one first and/or second and/or third locking hole is or are arranged at at least one radial inner and vertically arranged sheet section of the metal sheet, wherein at least one radial inner end of the first and/or second and/or third locking element each is engaged with the at least one first and/or second and/or third locking hole such that a rotation of the air dryer cartridge with regard to the housing portion is locked. A safe and reliable rotational fixing is a very important aspect for a proper and reliable operation of the air dryer cartridge. The additional or alternative association between the metal sheet (with regard to the flange fixing recesses as mentioned above) and the first, second, and/or third locking element provides a very simple, but reliable locking structure.

Further, due to the depressurization and/or deaeration channels inside the locking elements, the depressurization and deaeration of the interior of the air dryer cartridge may be simplified during mounting and de-mounting. There may be at least one depressurization and/or deaeration channel in the safety screw. This way, the safety locking function and also the depressurization and/or deaeration can be integrated into one element, i.e. for example the locking screw/safety screw.

According to the invention, an air dryer cartridge for an air treatment device for a vehicle, especially utility vehicle; is provided with at least one cartridge base and with at least one fixing interface as mentioned above. The advantages and technical teachings as discussed above with regard to the fixing interface, which partly is a sub-unit of the air dryer cartridge, are also transferable to the air dryer cartridge accordingly.

According to the invention, an air treatment device for a vehicle, especially utility vehicle, is provided with at least one housing comprising at least one housing portion; with at least one air dryer cartridge as mentioned above; and with at least one fixing interface as mentioned above. The advantages and technical teachings as discussed above with regard to the fixing interface and the air dryer cartridge, which are sub-units of the air treatment device, are also transferable to the air treatment device accordingly.

Further details and advantages of the present invention shall now be disclosed in an embodiment according to the invention in connection with the drawings.

DETAILED DESCRIPTION OF THE DRAWINGS

Figure 1:
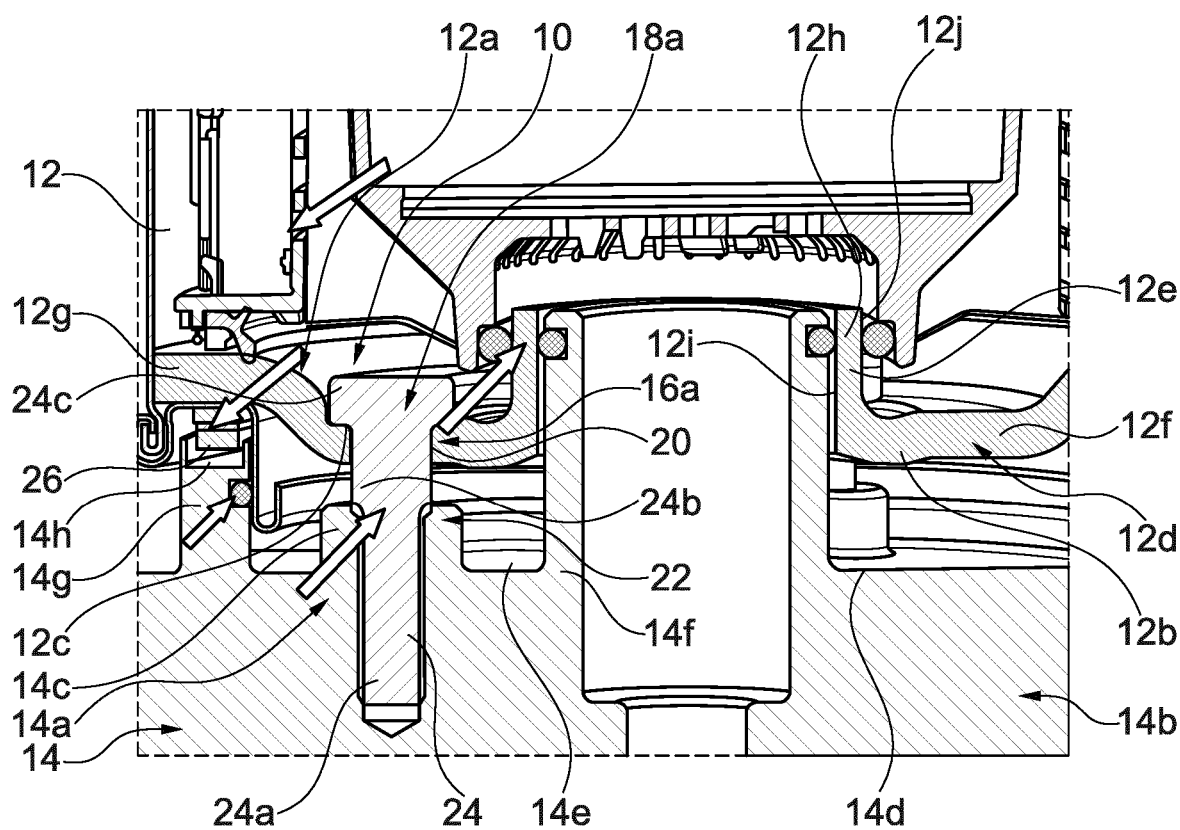
FIG. 1 is a schematic partial section view of an embodiment of a fixing interface according to the invention for an air dryer cartridge of a vehicle.

FIG. 1 shows a schematic partial section view of an embodiment of a fixing interface 10 according to the invention for an air dryer cartridge 12 of a utility vehicle (not shown).

The fixing interface 10 for fixing of an air dryer cartridge 12 and an air treatment device 14 for a utility vehicle has a cartridge base 12a assigned or assignable to the air dryer cartridge 12.

Especially, the first cartridge base 12a, in a mounted state, is fixed to the air dryer cartridge 12 at its bottom portion with regard to a mounted state.

Further, the cartridge base 12a comprises a fixing flange 12b.

The fixing interface 10 also comprises a housing portion 14a assigned or assignable to a housing 14b of the air treatment device 14 for fixing, in a mounted state, the fixing flange 12b to the housing portion 14a.

Especially, the housing portion 14a is integrally fixed or fixable to the housing 14b of the air treatment device 14.

The fixing flange 12b comprises a first flange fixing element 16a and the housing portion 14a further comprises a first housing fixing element 18a.

The first flange fixing element 16a and the first housing fixing element 18a, in the mounted state, are engaged with one another as can be seen in FIG. 1.

The first flange fixing element 16a is formed by a flange fixing recess 20.

The fixing flange 12b further comprises a second and third flange fixing element 16b, 16c (both not shown in FIG. 1) being formed in a same manner as the first flange fixing element 16a.

The first, second, and third flange fixing elements 16a, 16b, 16c may be arranged radially symmetrically to each other by an angle of ca. 120° with regard to the longitudinal axis (not shown) of the fixing interface 10.

Besides, the first housing fixing element 18a is formed by a housing fixing protrusion 22.

The housing fixing protrusion 22, at its freed end, is formed by a housing fixing pin 24.

The housing fixing pin 24 comprises a threaded section 24a that is threaded into a correspondingly threaded receiving or fixing protrusion 14c of the housing portion 14a.

The fixing pin 24 further comprises a fixing section 24b that, in the mounted state, is radially and tangentially engaged with the flange fixing recess 20 of the fixing flange 12b.

The fixing pin 24 also has a fixing head 24c that, in the mounted state, is axially engaged with an axial flange fixing portion 12c of the fixing flange 12b.

The fixing protrusion 14c of the housing portion 14a is formed by a circular-shaped protrusion integrally protruding from a ground 14d of a circular groove 14e in a direction towards the air dryer cartridge 12 with regard to the mounted state.

The housing portion 14a further comprises a second and a third housing fixing element 18b, 18c (both not shown in FIG. 1) formed in a same manner as the first housing fixing element 18a as described above.

The first, second, and third housing fixing elements 18a, 18b, 18c may be arranged radially symmetrically to each other by an angle of ca. 120° with regard to the longitudinal axis (not shown) of the fixing interface 10.

The circular groove 14e is radially formed between a central connection 14f for connecting the air treatment device 14 with the air dryer cartridge 12 and a radial outer circular-shaped collar 14g radially limiting the housing portion 14a of the housing 14b.

The central connection 14f and the radial outer circular-shaped collar 14g also protrude axially of air dryer cartridge 12 in a direction towards the fixing flange 12b.

The fixing flange 12b is formed by an integrally shaped disc member 12d that may be radially divisible into three radial sections: An inner radial section 12e, a middle radial section 12f and an outer radial section 12g.

The inner radial section 12e comprises a hollow cylindric sealing collar 12h with an outer and an inner sealing surface 12i, 12j for sealing the fixing flange 12b against the central connection 14f and a desiccant container base portion in order to enable a radial outer air flow path to flow separately from an air flow path inside the air dryer cartridge 12.

The radial middle radial section 12f is formed by a flat disc portion such that the flange fixing recess 20 may be formed precisely therein and that a defined axial fixing portion 12c for the fixing head 24c of the fixing pin 24 may be provided.

The radial outer section 12g is also formed by a flat outer disc portion such that a further defined axial and radial fixing section may be provided.

The radial outer section 12g, in the mounted state, is arranged axially above the radial middle section 12f.

The radial outer section 12g has an axial lower fixing surface, wherein the lower fixing surface, in the mounted state, is pretensioned by a pretension element 26.

In general, as may be depicted from FIG. 1, the pretension element 26 is axially arranged between the fixing flange 12b and the housing portion 14a for axial pretension, with regard to a longitudinal axis of the fixing interface 10 (not shown), of the fixing flange 12b against the housing portion 14a or vice versa.

More specifically, the pretension element 26 is supported by a ring-shaped supporting groove 14h being formed in a free axial end of the collar 14g that is faced towards the air fixing flange 12b.

Consequently, the pretension element 26 is formed by a ring-shaped pretension spring element.

Specifically, the pretension element 26 is formed by a ring-shaped pretension compression spring.

Additionally or alternatively, the pretension element 26 may be formed by a ring-shaped wave spring element or a wave spring element package (not shown).

Additionally or alternatively, the pretension element 26 may be formed by a ring-shaped disc spring element or a disc spring element package (not shown).

Due to the pretension element 26, the fixing flange 12b is axially pretensioned in an axial pretension direction that is oriented away from the housing portion 14a in order to provide a sufficient sealing force in an axial direction.

Further, as the air dryer cartridge 12 with regard to the air treatment device 14 moves during operation in axial direction in certain defined limits, this movement has to be compensated, which preferably may be established by the pretension element 26 such that the pretension is always maintained sufficiently.

Further, the axial pretension, in the mounted state, is axially locked or limited by the first, second and third housing fixing element in the form of the fixing pins 24 (the two additional fixing pins 24 are not shown in FIG. 1) together with the first, second, and third flange fixing elements 16a-16c (the two additional fixing recesses 20 are not shown in FIG. 1) and the fixing flange 12b, respectively.

As can be further seen in FIG. 1, the air dryer cartridge 12 for the air treatment device 14 for a utility vehicle (not shown) is partly shown according to a sectional view.

The air dryer cartridge 12 according to the invention comprises a cartridge base 12a that corresponds with the cartridge base 12a in connection with the fixing interface 10 as described above.

Accordingly, the air dryer cartridge 12, in the mounted state, further comprises the fixing interface 10 according to the invention as mentioned above.

The advantages and technical teachings as discussed above with regard to the fixing interface 10, which is partly a sub-unit of the air dryer cartridge 12, are also transferable to the air dryer cartridge 12 accordingly.

In this regard, an air treatment device 14 for an utility vehicle (not shown) according to the invention is further provided with a housing 14b comprising a housing portion 14a that corresponds to the housing portion 14a as mentioned above with regard to the fixing interface 10.

Accordingly, this air treatment device 14, according to the invention, is further provided with the air dryer cartridge 12 and with the fixing interface 10 as mentioned above.

Therefore, the advantages and technical teachings as discussed above and with regard to the fixing interface 10 and the air dryer cartridge 12, which are sub-units of the air treatment device 14, are also transferable to the air treatment device 14 accordingly.

The bold arrows and/or arrow parts that are not associated with a reference sign do not have any contribution to the subject-matter of the fixing interface 10, the air dryer cartridge 12 and the air treatment device 14 according to the invention, respectively.

Figure 2:
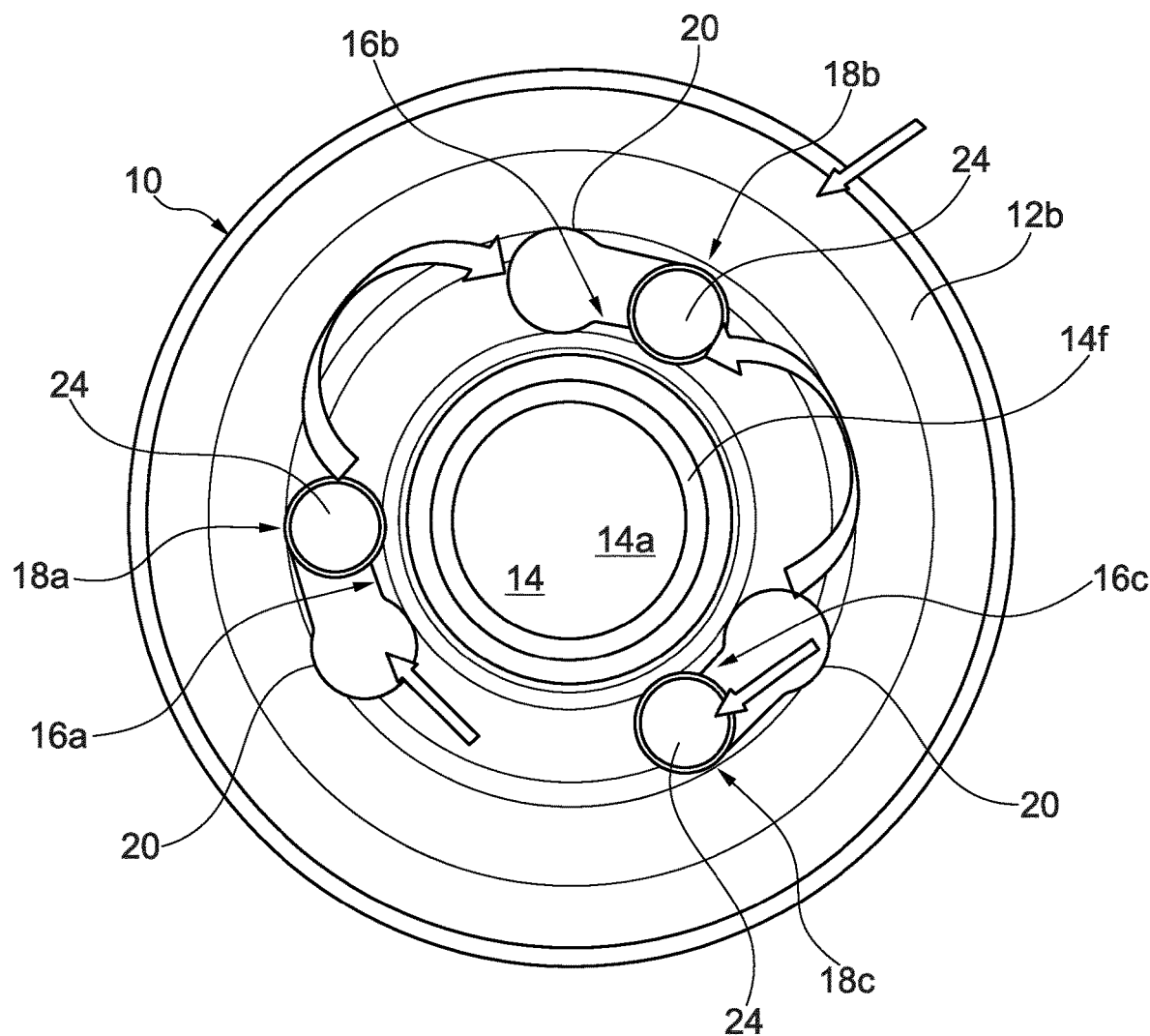
FIG. 2 is a schematic top view of the embodiment of the fixing interface of FIG. 1.

FIG. 2 shows a schematic top view of the embodiment of the fixing interface 10 of FIG. 1.

In FIG. 2, the fixing flange 12b together with the first, second, and third housing fixing elements 18a, 18b, 18c are shown.

The first, second, and third housing fixing elements 18a, 18b, 18c may be arranged radially symmetrically to each other by an angle of ca. 120° with regard to the longitudinal axis (not shown) of the fixing interface 10.

The first, second, and third housing fixing elements 18a, 18b, 18c each are formed by a fixing recess 20 having the form of a keyhole groove in which the first, second, and third flange fixing elements 16a, 16b, 16c each may engage.

The recess 20 may further be formed as a circular arc section having a first end with a wider diameter for passing the fixing pin head 24c therethrough in a pre-mounted state.

Accordingly, the recess 20 has a second end with a diameter that corresponds with the diameter of the fixing section 24b of the fixing pin 24 (see FIG. 1) for radially and tangentially holding the fixing pin 24 in its final fixed positions.

Thus, the recess 20 is here an elongated hole 20 with a broader opening on one side to accommodate a passing of the fixing head 24c of the fixing pin, and a narrower end for holding the fixing pin 24 and thus forming a bayonet-like fixation mechanism.

According to FIG. 2, the fixing flange 12b also comprises a second and a third flange fixing element 16b, 16c formed in a same manner as the first flange fixing element 16a as described above.

Accordingly, the housing portion 14a comprises a second and third housing fixing element 18b, 18c being formed in a same manner as the first housing fixing element 18a as described above.

Figure 3:
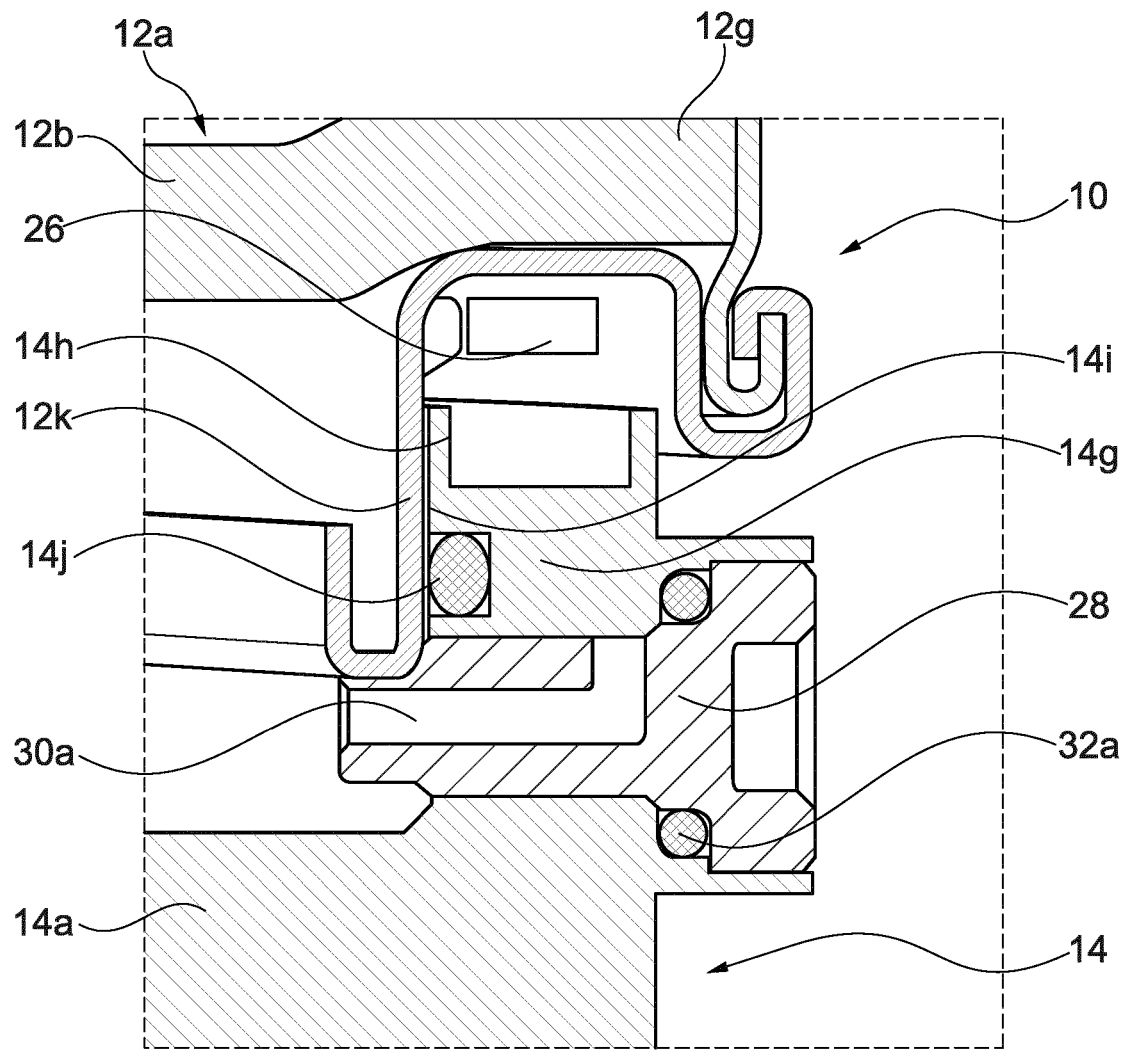
FIG. 3 is a further schematic partial section view of the embodiment of the fixing interface of FIG. 1.

FIG. 3 shows a further schematic partial section view of the embodiment of the fixing interface 10 of FIG. 1.

As may be depicted in more detail in FIG. 3, the fixing interface 10 comprises a circular ring-shaped metal sheet 12k being, in the mounted state, axially arranged between the outer circular-shaped collar 14g and the outer radial section 12g of the fixing flange 12b and pretensioned against it.

The circular ring-shaped metal sheet 12k has an asymmetrical u-shaped cross-section with two vertically arranged sheet sections of different lengths and one horizontally arranged sheet section and partially encloses the outer circular-shaped collar 14g in an axial and radial direction.

Further this metal sheet 12k is fixed to the air dryer cartridge 12 via a ring-shaped outer beading.

The radial outer circular-shaped collar 14g further accommodates the pretension element 26 for pretension the collar 14g, the metal sheet 12k and the fixing flange 12b against each other.

The collar 14g further comprises a radial inner collar sealing surface 14i with a radial sealing element 14j in the form of a rubber O-ring accommodated therein.

In the mounted state, the radial inner collar sealing surface 14i together with the sealing O-ring 14j stays in sealing contact with the metal sheet 12k via its inner radial and vertically arranged sheet section in order to establish a radial sealing structure.

According to FIG. 3, the locking element 28 in the form of a screw (the form of a pin or bolt is also conceivable) is radially screwed into the collar 14g and comprises a depressurization and deaeration channel 30a.

The locking element 28 also comprises a locking sealing 32a such that the depressurization and deaeration channel 30a, in the mounted state, is sealed against the atmosphere.

Further, a radial inner end of the locking element 28 is engaged with the metal sheet 12k at its inner radial and vertically arranged sheet section such that a rotation of the air dryer cartridge 12 with regard to the housing portion 14a is locked.

Thus, the metal sheet 12k and its first, second, and third locking holes, with regard to the three flange fixing elements 16a, 16b, 16c of FIG. 1 or 2, may serve as additional or alternative flange fixing elements such that a rotational degree of freedom of the fixing flange 12b with regard to the housing portion 14a is locked.

Additionally or alternatively, the locking element 28 may also be engaged, in the mounted state, with the at least one first flange fixing element 16a and/or the at least one first housing fixing element 18a (see FIG. 3).

The function of the fixing interface 10 is as follows:

Before assembling the air dryer cartridge 12 to the air treatment device 14, the air dryer cartridge 12 itself, as a sub-unit of the air treatment device 14, has to be present in a completely assembled state such that the fixing process may be started.

Then, the air dryer cartridge 12 has to be positioned in a certain axial distance away from the housing portion 14a.

The air dryer cartridge 12 has to be further positioned such that the three housing fixing pins 24 and specifically their fixing heads 24c each align with the corresponding first end of the recess 20.

If the alignment is correct, the axial distance between the air dryer cartridge 12 and the housing portion 14 is decreased such that each fixing pin head 24c may pass through the first end of the recess 20 until each fixing pin head 24a axially completely protrude from the corresponding fixing flange portion (see FIG. 1).

In this position, the air dryer cartridge 12 is rotated clockwise such that each fixing pin 24 moves from each first end to each second end of each recess 20.

In this regard, FIG. 2 shows the dryer cartridge 12 being rotated counterclockwise, wherein, of course, this direction of rotation is also applicable with an adapted design such that each recess 20 is aligned by 180° (as shown in FIG. 2) compared to the clockwise rotation that is the preferred one.

Therefore, the second end of each recess 20 each serves as a rotational stop for each fixing pin 24 such that the finally mounted state is reached and the fixing interface 10, in this mounted state, is established.

Fixation is then achieved by screwing in the fixation screw 28.

If the air dryer cartridge 12 has reached its lifetime, it has to be exchanged by a new air dryer cartridge 12, wherein the de-assembling is performed in a reverse order compared to the assembling order as mentioned above.

As a first step, fixation screw 28 is unlocked and thereby also in a controlled manner the system is depressurized.

Figure 4:
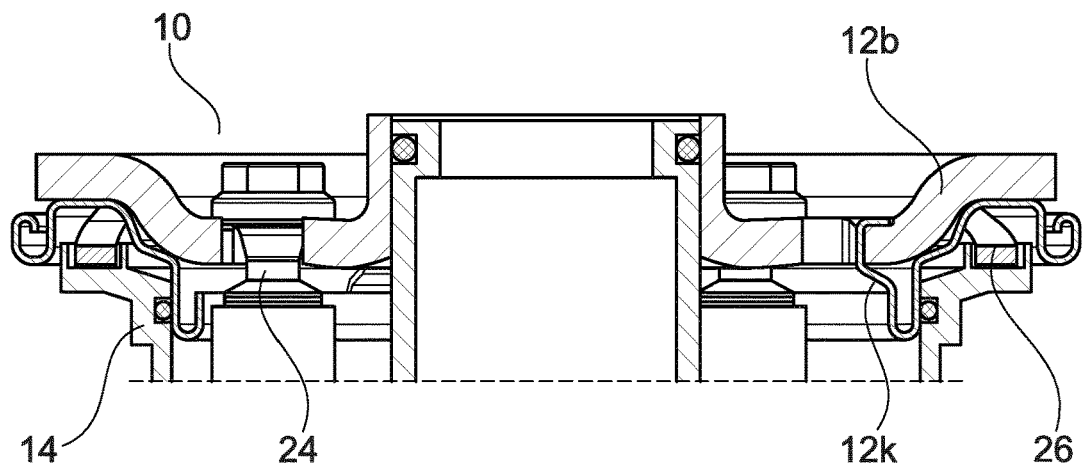
FIG. 4 is a fully assembled fixing interface according to the embodiment of FIG. 1.

FIG. 4 shows a fully assembled fixing interface 10 with the fixing flange 12b and the circular ring-shaped metal sheet 12k according to the embodiment of FIG. 1.

The circular ring-shape metal sheet 12k forms a cover sheet 12k. The cover sheet 12k is in this embodiment a formed (bent) metal sheet.

Also the pretension element 26 in the form of a wave spring (see also FIG. 9) is shown.

Figure 5:
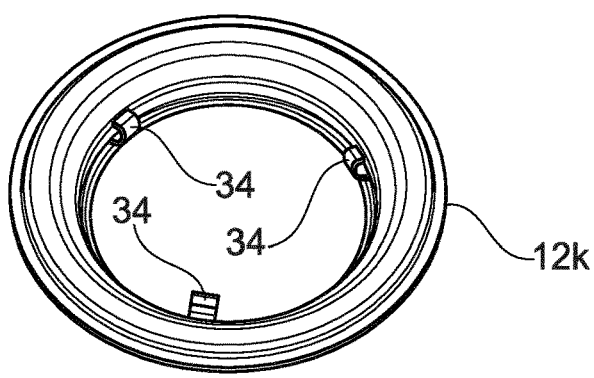
FIG. 5 shows the circular ring-shaped metal sheet (so-called cover sheet) of the fixing interface as shown in FIG. 4.

FIG. 5 shows the circular ring-shaped metal sheet (so-called cover sheet) of the fixing interface as shown in FIG. 4.

Figure 6:
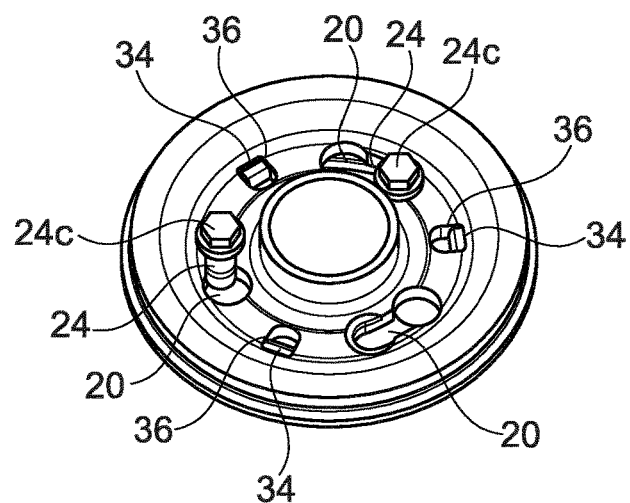
FIG. 6 is a top view on the fully assembled fixing interface of FIG. 4.

FIG. 6 shows a top view on the fully assembled fixing interface of FIG. 4. In this view, the fixing heads 24c of the housing fixing pins 24 can be seen. In this assembled state, the fixing heads 24c of the housing fixing pins 24 extend through the recess 20 (holes 20) as described above.

Also, it can be seen that the cover sheet 12k has fixing ends 34 (see FIG. 5 and FIG. 6). In the shown embodiment, there are three fixing ends 34 formed as protrusions or tabs (as in the shown embodiment) at the inner ring part of the cover sheet 12k.

The fixing ends 34 are an integral part of the cover sheet 12k.

The tabs 34 are bent into respective tab grooves 36 in the fixing flange 12b. Each tab groove 36 is located between two adjacent or neighbouring holes 20.

Thus, likewise the holes 20, the tab grooves are regularly arranged and because of the presence of three (3) tab grooves, they are arranged at every 120° position. This is dependent of the used number of tab grooves 36 and holes 20 and fixing pins 24.

Depending on the necessary working conditions, less or more tab grooves 36 and holes 20 and fixing pins 24 can be used.

The form of the tab groove 36 is arranged such that it is adapted to the contours of the tabs 34, especially the form of the ends of the tabs 34.

Figure 7:
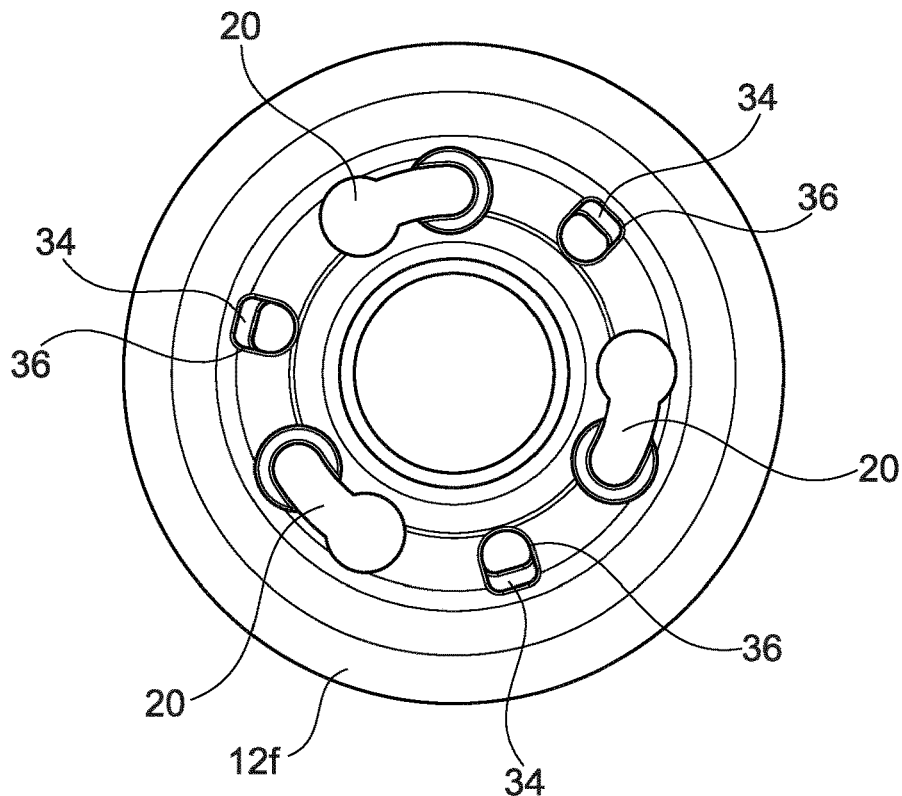
FIG. 7 is a top view on the fixation of the cover-sheet to the flange of the embodiment of FIG. 4.
Figure 8:
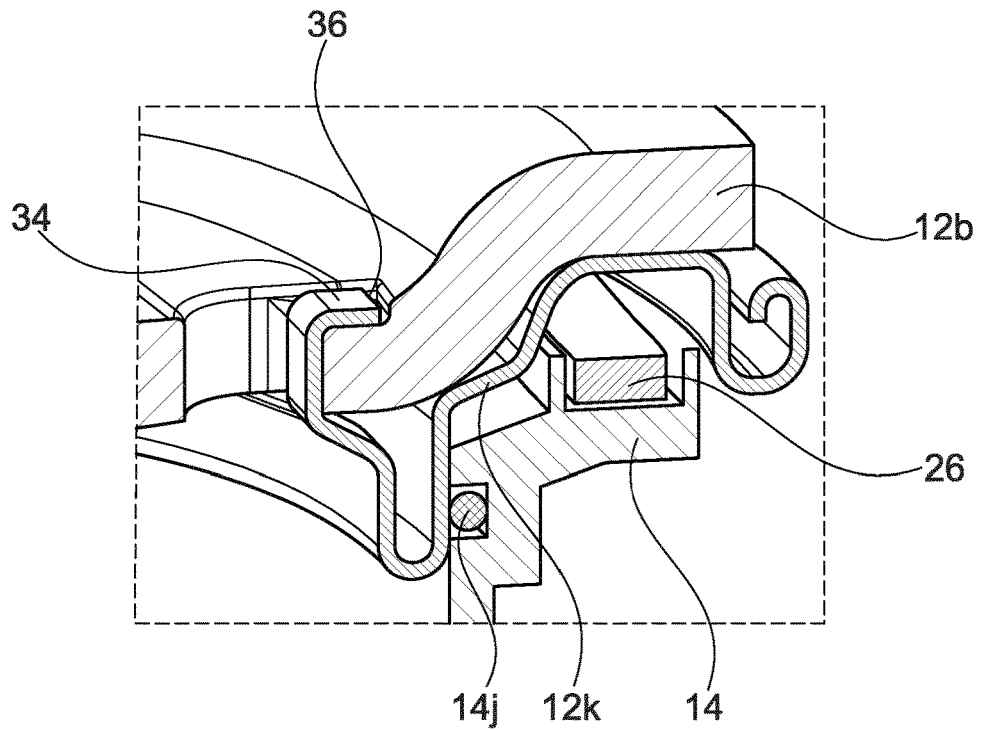
FIG. 8 is a further detail of the fixation of the cover-sheet to the flange of the embodiment of FIG. 4.

This is especially shown in FIG. 7 and FIG. 8. FIG. 7 shows a top view on the fixation of the cover-sheet to the flange of the embodiment of FIG. 4 and FIG. 8 shows a further detail of the fixation of the cover-sheet to the flange of the embodiment of FIG. 4.

Figure 9:
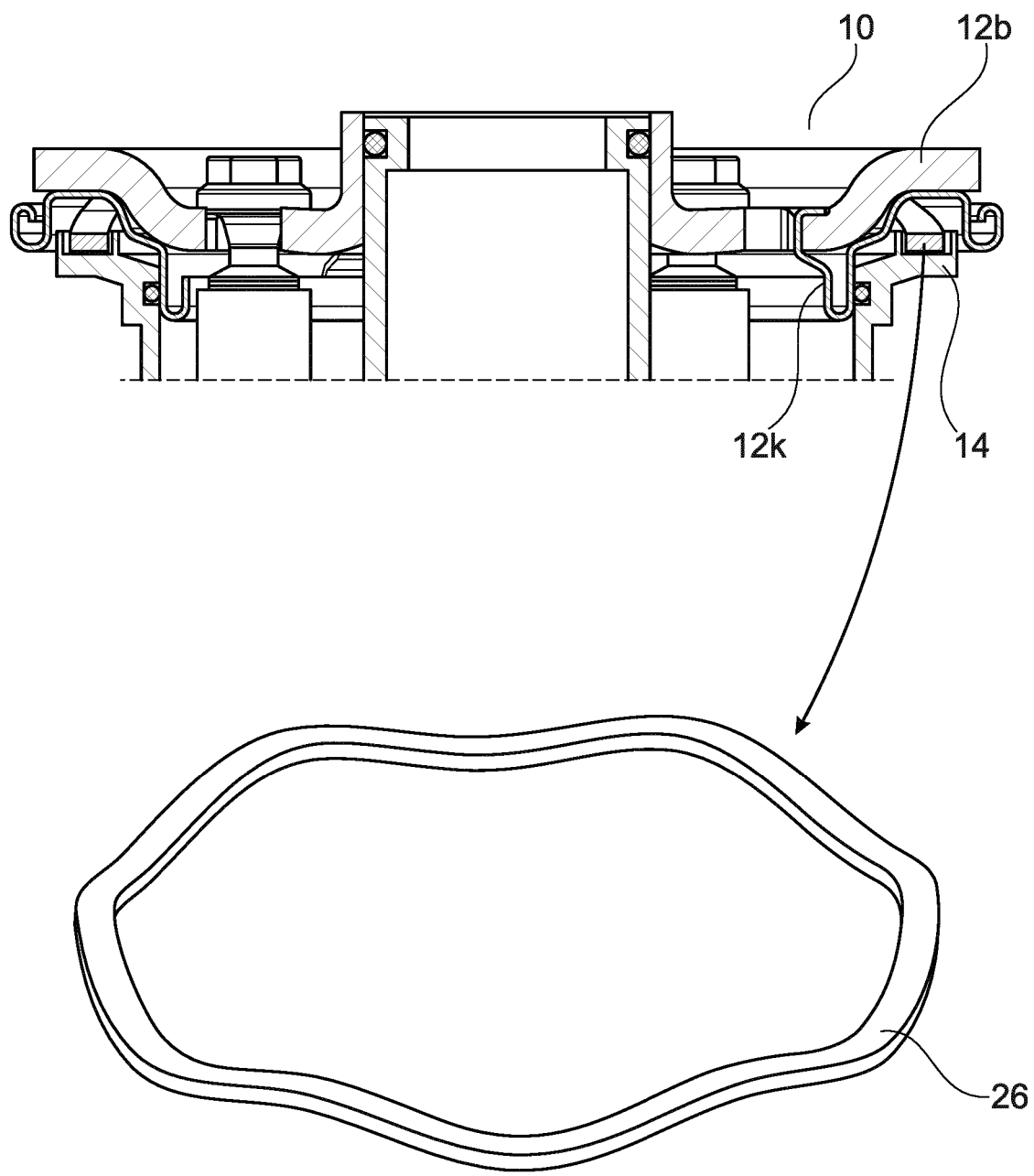
FIG. 9 is a further detail regarding a first embodiment of the pretension element in form of a wave spring as used in the embodiment shown in FIG. 4.

FIG. 9. a further detail regarding a first embodiment of the pretension element 26 in form of a wave spring as used in the embodiment shown in FIG. 4.

The wave spring 26 is made of a spring steel.

As one can see from FIG. 9, the wave spring is round and goes up and down in waves along its body form. This way, the wave spring provides in the mounted state of the fixing interface 10 a sufficient pretension force due to compression between the fixing flange 12b and housing 14b.

Figure 10:
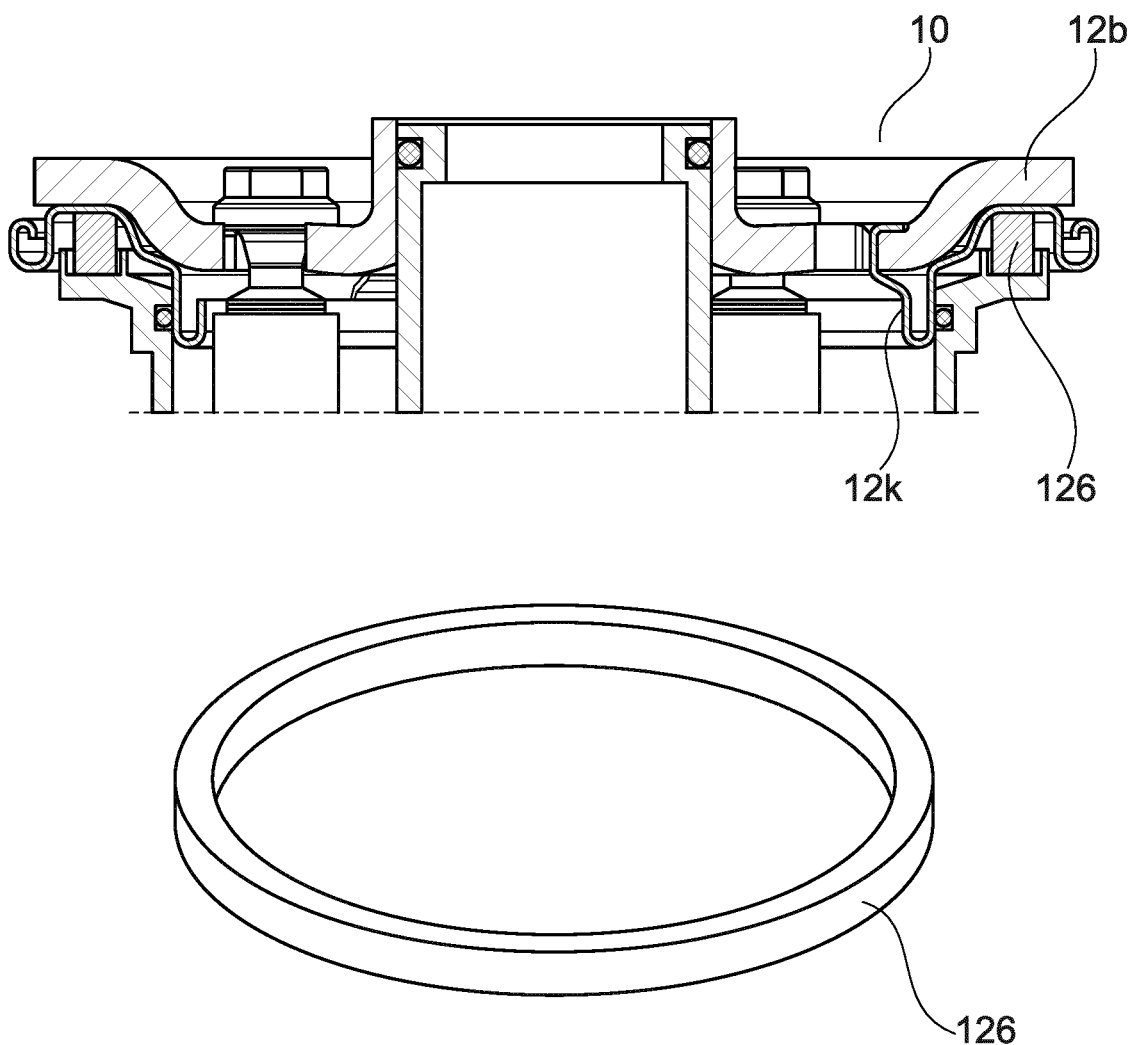
FIG. 10 is an alternative embodiment of the pretension element in the form of a rubber spring.

FIG. 10 shows an alternative embodiment of the pretension element 126 in the form of a rubber spring 126.

The embodiment of FIG. 10 comprises except the rubber spring 126 each and every feature in terms of structure and function as the embodiment described in connection FIG. 1 to FIG. 9.

Figure 11:
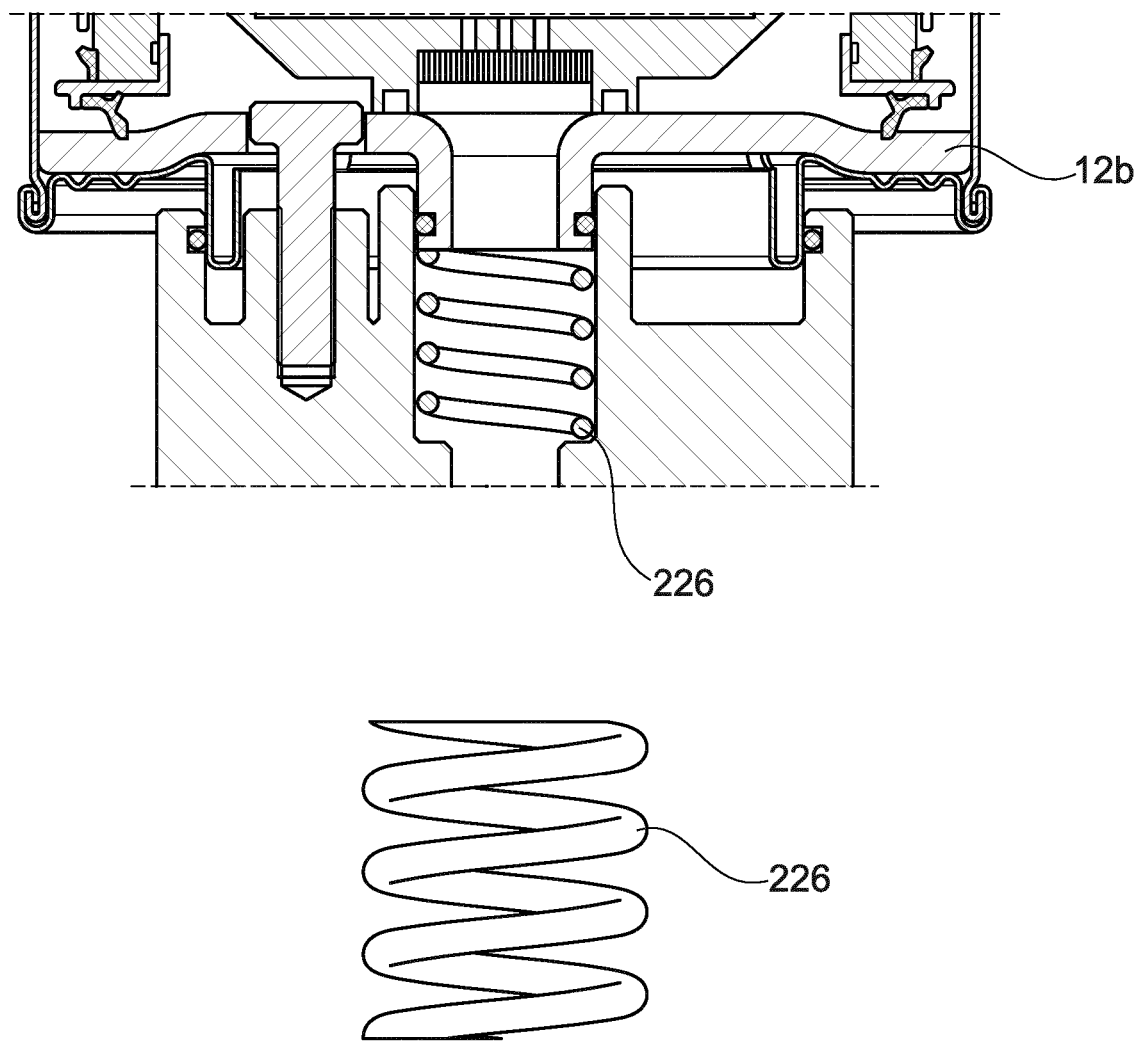
FIG. 11 is a further alternative embodiment of the pretension element in the form of a compression spring.

FIG. 11 shows a further alternative embodiment of the pretension element 226 in the form of a compression spring 226.

The embodiment of FIG. 11 comprises except the compression spring 226 and its arrangement each and every feature in terms of structure and function as the embodiment described in connection FIG. 1 to FIG. 9.

The arrangement of the compression spring 226 is such that is loaded directly against the middle portion of the fixing flange 12b and a shoulder in the middle bore of the housing 14b.

REFERENCE SIGNS 10 fixing interface
12 air dryer cartridge
12a cartridge base
12b fixing flange
12c axial flange fixing portion
12d disc-shaped member
12e inner radial section
12f middle radial section
12g outer radial section
12h sealing collar 12*i* inner sealing surface
12*j* outer sealing surface
12*k* circular ring-shaped metal sheet
14 air treatment device
14*a* housing portion
14*b* housing
14*c* receiving or fixing protrusion
14*d* ground
14*e* circular groove
14*f* central connection
14*g* outer circular-shaped collar
14*h* supporting groove
14*i* radial inner collar sealing surface
14*j* radial sealing element
16*a* first flange fixing element
16*b* second flange fixing element
16*c* third flange fixing element
18*a* first housing fixing element
18*b* second housing fixing element
18*c* third housing fixing element
20 recess
22 housing fixing protrusion
24 housing fixing pin
24*a* threaded section
24*b* fixing section
24*c* fixing head
26 pretension element
28 locking element
30 depressurization and deaeration channel
32*a* locking sealing
34 fixing end
36 tab groove
126 pretension element, rubber spring
226 pretension element, compression spring

The invention claimed is:

1. A fixing interface for fixing an air dryer cartridge and an air treatment device for a utility vehicle, comprising:
   a cartridge base assignable to the air dryer cartridge, wherein
   the cartridge base comprises a fixing flange and a circular ring-shaped metal sheet in contact with the fixing flange in a mounted state;
   a housing portion assignable to a housing of the air treatment device for fixing, in a mounted state, the fixing flange to the housing portion, wherein
   the fixing flange comprises a first flange fixing element, and
   the housing portion comprises a first housing fixing element,
   the first flange fixing element and the first housing fixing element, in the mounted state, are engaged with one another; and
   a locking element, wherein the locking element, in the mounted state, is engaged either directly and/or indirectly with the first flange fixing element and/or the first housing fixing element such that at least one degree of freedom of the fixing flange with regard to the housing portion, or vice versa, is locked.

2. The fixing interface according to claim 1, wherein the locking element is a safety screw.

3. The fixing interface according to claim 1, wherein the locking element comprises at least one depressurization and/or deaeration channel.

4. The fixing interface according to claim 1, wherein the locking element is fixed to the circular ring-shaped metal sheet and/or the housing portion.

5. The fixing interface according to claim 1, wherein the circular ring-shaped metal sheet is in contact against a radial sealing element.

6. The fixing interface according to claim 1, wherein the at least one degree of freedom is at least one rotational degree of freedom.

7. The fixing interface according to claim 1, wherein the first flange fixing element is formed by a flange fixing recess.

8. The fixing interface according to claim 1, wherein the first housing fixing element is formed by at least one housing fixing protrusion.

9. The fixing interface according to claim 1, wherein the fixing flange comprises a second flange fixing element being formed in a same manner as the first flange fixing element, and
   the housing portion comprises a second housing fixing element being formed in a same manner as the first housing fixing element.

10. The fixing interface according to claim 9, wherein the fixing flange comprises a third flange fixing element being formed in a same manner as the first flange fixing element, and
    the housing portion comprises a third housing fixing element being formed in a same manner as the first housing fixing element.

11. The fixing interface according to claim 1, wherein the fixing interface, in the mounted state, comprises at least one pretension element.

12. The fixing interface according to claim 11, wherein the at least one pretension element is axially arranged between the fixing flange and the housing portion for axial pretension, with regard to a longitudinal axis of the fixing interface, of the fixing flange against the housing portion, or vice versa.

13. The fixing interface according to claim 12, wherein the circular ring-shaped metal sheet forms a groove, in which the at least one pretension element is received.

14. The fixing interface according to claim 13, wherein the at least one pretension element is formed by at least one ring-shaped pretension spring element.

15. The fixing interface according to claim 12, wherein the axial pretension, in the mounted state, is locked and/or limited by the first, a second, and/or a third housing fixing element together with the first, a second, and/or a third flange fixing element, respectively.

16. The fixing interface according to claim 11, wherein the housing portion comprises a radial outer circular-shaped collar, accommodating the pretension element,
    the collar further comprises a radial inner collar sealing surface accommodating at least one radial sealing element therein.

17. The fixing interface according to claim 10, wherein the first and/or second and/or third flange fixing element, additionally or alternatively, is or are formed by a first and/or second and/or third locking hole of at least one metal sheet that, in the mounted state, is fixed to the air dryer cartridge and is arranged between the fixing flange and the housing portion.

18. The fixing interface according to claim 17, wherein the first and/or second and/or third locking hole is or are arranged in at least one radial inner and vertically arranged sheet section of the metal sheet, and
    at least one radial inner end of the first and/or second and/or third locking element each is engaged with the first and/or second and/or third locking hole such that a rotation of the air dryer cartridge with regard to the housing portion is locked.

19. An air dryer cartridge for an air treatment device for a utility vehicle, comprising:
- a cartridge;
- a cartridge base of the cartridge; and
- a fixing interface for fixing the cartridge on an air treatment device for a utility vehicle, wherein
- the cartridge base comprises a fixing flange and a circular ring-shaped metal sheet in contact with the fixing flange in a mounted state;
- a housing portion assignable to a housing of the air treatment device for fixing, in a mounted state, the fixing flange to the housing portion, wherein
- the fixing flange comprises a first flange fixing element, and
- the housing portion comprises a first housing fixing element,
- the first flange fixing element and the first housing fixing element, in the mounted state, are engaged with one another; and
- a locking element, wherein the locking element, in the mounted state, is engaged either directly and/or indirectly with the first flange fixing element and/or the first housing fixing element such that at least one degree of freedom of the fixing flange with regard to the housing portion, or vice versa, is locked.

20. An air treatment device for a utility vehicle, comprising:
- a housing comprising a housing portion; and
- an air dryer cartridge, the air dryer cartridge comprising:
  - a cartridge;
  - a cartridge base of the cartridge; and
  - a fixing interface for fixing the cartridge on the air treatment device, wherein
  - the cartridge base comprises a fixing flange and a circular ring-shaped metal sheet in contact with the fixing flange in a mounted state, the fixing flange being fixable to the housing portion in a mounted state,
  - the fixing flange comprises a first flange fixing element, and
  - the housing portion comprises a first housing fixing element,
  - the first flange fixing element and the first housing fixing element, in the mounted state, are engaged with one another; and
- a locking element, wherein the locking element, in the mounted state, is engaged either directly and/or indirectly with the first flange fixing element and/or the first housing fixing element such that at least one degree of freedom of the fixing flange with regard to the housing portion, or vice versa, is locked.

* * * * *